April 16, 1968

L. D. RAMPINO 3,378,485

CLARIFICATION OF CAUSTIC TREATED DISTILLATE FUELS

Filed Aug. 23, 1965

INVENTOR.
LOUIS D. RAMPINO
BY
Owen, Wickersham & Erickson
ATTORNEYS

United States Patent Office 3,378,485
Patented Apr. 16, 1968

3,378,485
CLARIFICATION OF CAUSTIC TREATED
DISTILLATE FUELS
Louis D. Rampino, Concord, Calif., assignor to Getty Oil
Company, a corporation of Delaware
Filed Aug. 23, 1965, Ser. No. 481,567
11 Claims. (Cl. 208—263)

ABSTRACT OF THE DISCLOSURE

Haze generating materials (such as metallic soaps) present in caustic-treated diesel fuel distillates, and similar light oils, are removed by passing the liquid oil through a bed of hydrodesulfurization catalyst. Temperatures below about 140° F. are used and below 100° F. are preferred. Preferred contact materials are sulfided cobalt-molybdate, molybdena-on-alumina, and other materials having molybdenum-containing acidic surfaces.

---

Figure 1:
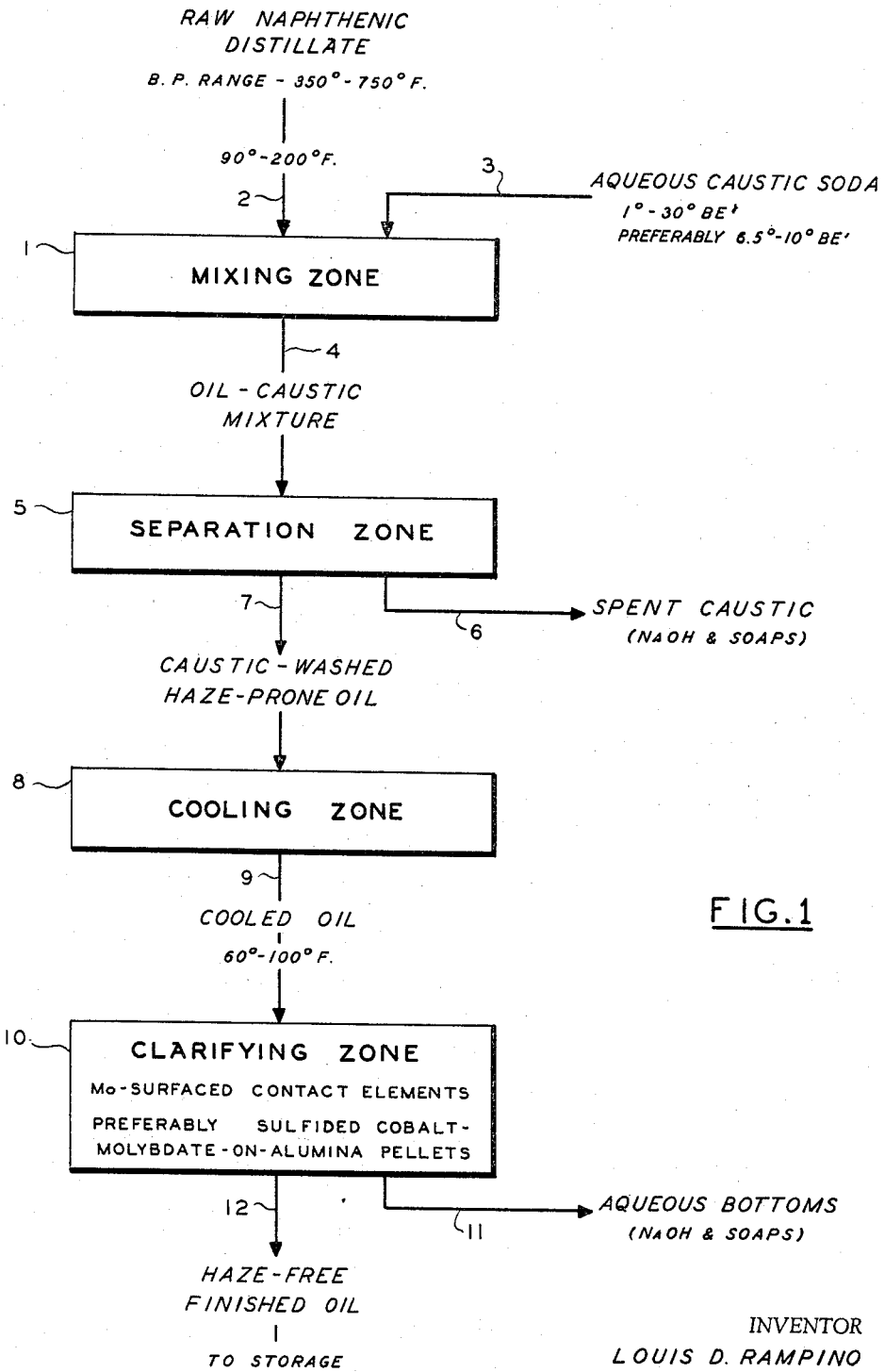

This invention relates to the treatment of diesel fuel distillate and other light petroleum oils. More particularly, it relates to the removal of haze from light oils after treatment with alkali for the removal of naphthenic acids, phenols and/or other acidic organic materials.

In the manufacture of marketable light hydrocarbon distillates, particularly those obtained from naphthenic base crude oils, it is common practice to treat them with strong alkali such as caustic soda in order to remove naphthenic acids and other materials detrimental to the color stability of the oils. Such treatment usually comprises intimate contacting of the oil with an aqueous solution of caustic soda followed by separation of the resulting aqueous phase containing sodium reaction products of the naphthenic acids and/or other acidic materials originally present in the oil. Formerly, the separation was usually accomplished by mere settling but, more recently, electrostatic precipitators of various design have been employed to obtain more efficient separation of the aqueous phase from the oil phase. After separation, the oil may be passed through a vessel containing rock salt to remove moisture, or it may be dried by contact with dry air, or both.

Such caustic treated oils, even though carefully dried, in many instances either remain hazy or develop a haze formation particularly when in contact with water. Such cloudiness detracts from the salability of the oil and gives rise to detrimental deposits. The exact nature of the haze or cloudiness is not known. It is believed to be caused by traces of various reaction products (probably including various metallic soaps) whose composition may vary depending upon such variables as the original composition of the oil, impurities in the caustic solution, temperature and other conditions of the treatment. Various attempts to eliminate the hazing have been unsatisfactory, including passing the treated oil through such materials as salt, sand, activated charcoal, and activated bauxite. Some of these materials (such as charcoal and bauxite) initially remove the haze but, after only a short period of use, become wetted with the aqueous material removed and no longer are effective. Common filtering materials (e.g., filter paper) are unsatisfactory for similar reasons. A second treatment through an electrostatic separator, with and without prewashing with caustic solution and/or water, likewise proved insufficient to eliminate the haze formation. Although it might be expected that the haze-forming constituents could be eliminated by redistillation or by chemical treatment (such as with concentrated sulfuric acid), such treatments are expensive, require an excessive amount of apparatus, and entail some loss of valuable oil.

I have discovered that clear, bright oils, with no tendency to haze in the presence of water, can be obtained by passing the caustic-treated oil (after separating the caustic solution) through an unheated bed of certain contact materials. My preferred material for this purpose is a sulfided cobalt-molybdate-on-alumina catalyst such as is commercially employed in the hydrodesulfurization of petroleum fractions. For example, U.S. Patents 2,325,033, 2,325,034, 3,076,755 and 3,081,258 describe some catalysts of this nature. Other similar catalytic materials having acidic surfaces, such os molybdena on alumina, may also be used. Although fresh cobalt-molybdate catalyst, as obtained from the manufacturer, is somewhat satisfactory for my purposes, more efficient results are obtained from catalyst which has been "sulfided" during use in hydrodesulfurizing operations by the conversion of part or all of the cobalt molybdate to cobalt thiomolybdate and/or other sulfur compounds. Excellent results have been obtained with cobalt-molybdate catalyst which had been used in hydrodesulfurizing operations for a long period of time and until its hydrodesulfurization activity had diminished greatly by the accumulation thereon of carbonaceous matter. Apparently, the carbonaceous matter of the used catalyst has no detrimental effect on its usefulness in the present invention. These materials are effective when dry or initially wet with water. They are effective even after they have become completely wetted with caustic entrained in the oil.

In referring herein to the hydrodesulfurization catalyst as "catalyst" I do not wish to infer that its use in the present invention necessarily involves a catalytic reaction, although certain catalytic effects may be present to a small or large extent. My use of the term "catalyst" is merely for convenience in referring to a material of commerce customarily used in catalytic reactions.

The rate at which the oil is passed through the catalyst is not critical, and the selection of proper rates is well within the skill of a process engineer. Liquid hourly space velocities from about 0.5 to 15, with superficial linear velocities from 0.002 to 0.030 ft./sec., have been satisfactorily used, though these rates are not necessarily limiting.

The temperature at which the oil is passed through the catalyst bed is more important. In general, more reliable results are obtained the cooler the oil. Though satisfactory results have been obtained with the oil temperature about 140° F., in most instances the oil temperature should be below 100° F., and preferably below 90° F. Still lower temperatures (such as about 70° F.) are to be recommended, if readily obtainable without objectionable cost, and may be needed in some instances such as, for example, where the original oil is particularly refractory or where the caustic treatment and/or the separation has been inadequate.

Figure 2:
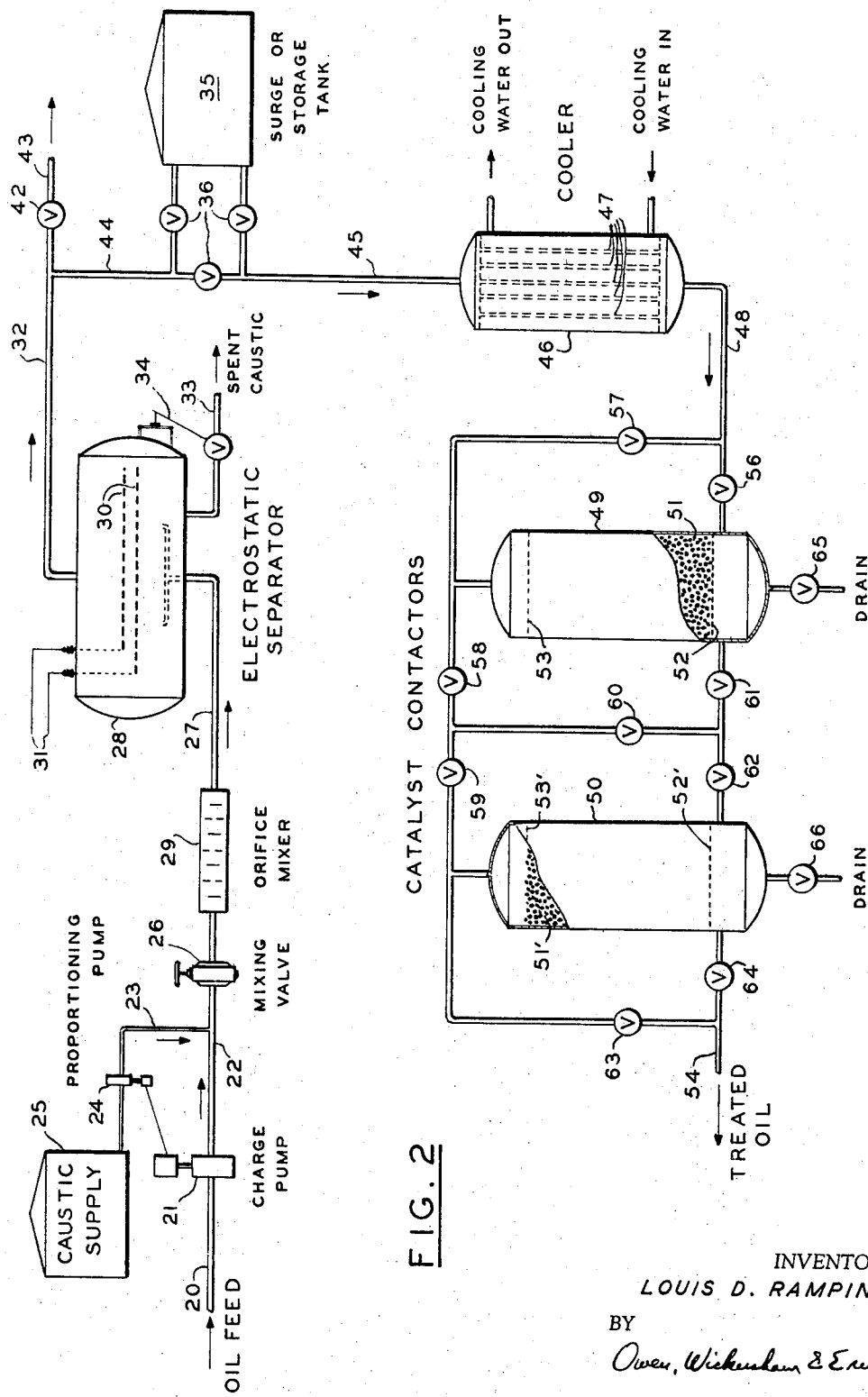

The invention may be more readily understood by reference to the drawing in which:

FIG. 1 is a flow diagram outlining the preferred treatment of the raw distillate including caustic washing, settling, and haze-clarification steps; and FIG. 2 is a non-scale diagrammatic illustration of apparatus suitable for caustic washing, settling, and haze-removal according to the invention.

In FIG. 1 raw distillate containing naphthenic acids, and/or phenols and the like, is fed to mixing zone 1 through line 2 along with aqueous caustic soda through line 3. In mixing zone 1 the oil and caustic solution are brought into intimate contact in order that the caustic soda may react with the naphthenic acids (and/or other acidic materials) in the oil to form water-soluble soaps which will dissolve in the aqueous caustic solution. The contacting may be carried out by any suitable means capable of producing the desired degree of intimate contact. Mechanical agitators or churns and the like may be used. Excellent contact is usually obtained by pumping the oil, in admixture with the caustic solution, through mixing orifices or through a mixing valve adjusted or constructed to give an effective pressure drop therethrough. The temperature of the contacting is not critical. Higher temperatures may be expected to give better results for several reasons including higher chemical reactivity and reduced viscosity. Ordinarily, the temperature will depend upon the temperature of the incoming oil which, for practical reasons, may be taken directly from the condensers at a distillation unit with temperatures approximately 125°–175° F., or it may be taken (wholly or in part) from storage where the temperature may be near atmospheric. For good contact, temperatures above at least 90° F. are advisable. The strength of the caustic solution is indicated in FIG. 1 as from 1° to 30° Bé. with 6.5° to 10° Bé. prefarable. The ratio of caustic solution to oil charged to the process is determined by the acid content of the soil, the required amounts being determined by the operator.

The oil and caustic solution, in the form of an intimate mixture, is passed from mixing zone 1 through line 4 to a separation zone 5 wherein the aqueous phase is separated from the oil phase; the separated aqueous phase, leaving through line 6, contains unreacted caustic soda and soda soaps (and/or salts) produced by reaction with the acid content of the oil. Any suitable means of separation may be employed in zone 5. Ordinary settling is satisfactory but time consuming, while centrifuging and filtering are expensive. One of the most satisfactory means of separating the two phases is with an electrostatic separator, of which there are numerous designs varying with the particular application involved. In this type of equipment, a mixture or emulsion of oil and water is passed between electrodes charged with high potential electricity. The electric field between the electrodes cause the water droplets to coalesce into larger drops which readily settle, and even somewhat stable emulsions may thereby be broken.

The oil seperated from the caustic solution in separation zone 5 leaves through line 7. This oil, now free from most of its naphthenic acids content, may be dried (as by passing through a bed of rock salt, or other moisture-absorbing medium and/or by blowing with dry air) and sent to market. However, it has been found that, even after drying, this caustic treated oil may be hazy and, whether hazy or not, will develop haze in storage when in contact with moisture. Prevention of this haze is the problem to which the present invention is directed.

To this end, the caustic-washed haze-prone oil, which leaves the separation zone 5 at temperatures usually exceeding 100° F., and sometimes as high as 180° F. or more, is first colled to below 100° F., by passing it to cooling zone 8, which may be any desired form of heat-exchanger or may be merely atmospheric storage. Depending upon the availability of cooling water of satisfactory purity, a direct-contact heat exchanger may be used, wherein the cooling water is admixed directly with the oil and then separated. The water washing provided by such a heat-exchanger may, under some circumstances, be advantageous. Preferably, the oil is cooled to a temperature below 90° F., such as for example to between 60° and 80° F. It is then passed through line 9 to clarifying zone 10.

In clarifying zone 10, the cooled oil is passed through a bed, or column, of selected contact elements. Preferably, the contact elements are beads or pellets of catalytic materials such as the sulfided cobalt-molybdate-on-alumina pellets commonly employed as catalyst in hydrodesulfurization reactions. The size of the pellets, or beads, is not critical, although the ⅛″ cylinders of hydrodesulfurization catalyst common in the art are appropriate. The shape and size of the bed or column and the rate of flow of the oil therethrough may be varied by the operator to meet the particular conditions encountered.

Caustic solution, soaps and other matter removed from the oil by passasge through the catalyst in zone 10 are drained off through line 11, and the finished oil leaves through line 12. When sulfided cobalt-molybdate hydrodesulfurization catalyst is used in zone 10, its useful life appears to be quite long and, when debilitated, it can usually be revived by washing with water and drying with an inert gas such as flue gas or dry steam. Drying with air is objectionable due to the danger of combustion of the sulfided catalyst.

Any haziness present in the oil leaving clarifying zone 10 will in time settle out and/or may be readily removed by passage through a salt tower or by other drying means. This is in distinction to the haze, mentioned prior, occurring in the oil leaving separation zone 5 through line 7 (or developing therein in storage) which cannot ordinarily be cleared by any common drying means.

In the operation of the apparatus illustrated in FIG. 2, a stream of naphthenic distillate to be treated is charged from line 20 by charge pump 21 through line 22 where there is added a required amount of aqueous caustic soda solution supplied through line 23 by proportioning pump 24 from caustic supply tank 25. Proportioning pump 24 is so connected to charge pump 21 (as indicated), or to a flow meter (not shown) in line 22, as to provide a desired ratio of caustic soda solution to oil, which ratio depends upon the naphthenic acid content of the oil. The mixture of oil and caustic solution in line 22 is forced, under the pressure exerted by pump 21, through mixing valve 26 and line 27 into electrostatic separator 28. Mixing valve 26 may be an almost-closed gate valve, for example, or it may be any spring-loaded valve designed to produce a high local velocity therein sufficient to thoroughly intermix the caustic solution with the oil, in accordance with well-known engineering principles. If desired, an orifice mixer 29 may be included in line 27 (or substituted for valve 26) to augment the dispersion of the caustic into the oil, though not ordinarily needed with a properly functioning mixing valve 26. With proper dispersion in line 27, the caustic immediately reacts with the acid content of the oil, resulting in the formation of water-soluble soaps.

The oil-caustic mixture from line 27 enters the separator 28 in the form of a more or less loosely bound emulsion of oil and caustic solution. In electrostatic separator 28 the oil-caustic emulsion is brought into an electric field created by one or more pairs of electrodes, indicated in FIG. 2 by electrodes 30 connected to a source of high potential electricity 31. Under the influence of the electric field, the droplets of caustic solution (now containing the reacted naphthenic acids in solution) coalesce into larger drops which readily settle from the oil and accumulate as a liquid layer at the bottom of separator 28. The separated oil leaves through line 32, and the settled caustic solution is drawn off through line 33 controlled by level-control valve 34. Electrostatic separators of this nature are well known in the art, and the details of design and operation are within the skill of an engineer familiar with this art. (See U.S. Patents 2,855,357, 2,855,359 and those cited therein.)

To this point, the process and apparatus described in relation to FIG. 2 are more or less conventional and, in conventional practice, the separated oil in line 32 is passed, as through valve 42 and line 43 to a rock salt filled drying tower (not shown) and thence to storage. However, as previously stated herein, oil treated in this manner, even after drying with heated air, in many cases is hazy or tends to become hazy on standing, especially in the presence of moisture. The elimination of this cloudiness, or haze-forming tendency, is the purpose of the apparatus depicted in the remainder of FIG. 2.

When operating in accordance with the invention, valve 42 is closed and oil from line 32 is passed directly through lines 44 and 45 to heat-exchanger 46 which may comprise a "bundle" of parallel tubes (indicated by tubes 47) surrounded by a bath of cooling water. In most operations, particularly when the oil entering through line 20 is received directly from a distillation unit, the oil in line 32 will be at a temperature above 90° F., and usually 100°–170° F. In cooler 46 the temperature is reduced so that the oil leaving through line 48 is preferably between 70° and 85° F. The cooled oil in line 48 is passed through one or more contactors, represented by contactors 49 and 50, each filled with catalyst pellets 51 and 51' between supporting screens 52 and 52' and bed levels 53 and 53'. As stated prior, the catalyst pellets may advantageously be ⅛" cylinders composed of sulfided cobalt-molybdate on alumina. Upon passage through the catalyst, the haze-forming constituents are removed and the finished oil leaves through line 54.

The flow through the contactors 49 and 50 may be either upward or downward, series or parallel, and valves 58, 59, 60, 61, 62, 63 and 64, with suitable connecting piping as shown, are provided to permit any operation desired; thus, with valves 57, 59, 61 and 64 closed, the flow from pipe 48 would be through valve 56, upward through contactor 49, through valves 58, 60 and 62, then upward through contactor 50 and thence through valve 63 to treated oil line 54. With valves 56, 58, 62 and 63 closed, the flow would be series-downflow, i.e., through valve 57, down through contactor 49, through valves 61, 60 and 59, then down through contactor 50, and out through valve 64. Parallel upflow can be provided by closing valves 57, 60 and 64, whereby the flow would be first through valve 56 into the bottom of contactor 49, where part of the oil would pass upwardly therein and the remainder would pass through valves 61 and 62 into the bottom of contactor 50 to pass upwardly therethrough and then be joined by oil coming from contactor 49 (through valves 58 and 59), the combined streams then leaving through valve 63 and line 54. Similarly, parallel downflow would be provided with valves 56, 60 and 63 closed. By closing valves 56, 58, 59, 60 and 64 the oil from line 48 can be made to pass first downwardly through contactor 49 and then upwardly through contactor 50, which mode of operation may be advantageous with a very wet oil where most of the water would be removed in the first (downflow) contactor with upward flow of the drier oil through the second contactor. If, perchance desired, an up-flow down-flow series would be effected with valves 57, 60, 61, 62 and 63 closed. Regardless of the direction of flow, the aqueous material removed from the oil in each of contactors 49 and 50 collects in the space below the catalyst screens 52 and 52' and is periodically drawn off through valves 65 and 66.

Rather than pass oil directly from line 32 to cooler 46, a tank (or tanks) 35, with suitable valves 36 and any required pumps (not shown), may be interposed between lines 44 and 45 to compensate for differences in flow rates between the output of the electrostatic separator 28 (line 32) and the desired input rate to contactors 49 and 50 (line 45), and/or to provide storage or feed at times when any part of the apparatus may be shut down for service or repair, or to provide a settling time when desired. When the oil from line 32 has been in storage for some time, it may have cooled sufficiently that cooler 46 may be dispensed with and oil from storage 35 may be passed directly into line 48. Cooler 46 may likewise be by-passed at times when the oil in line 32 is below 90° F., as when the feed oil (line 20) is cold.

The size and shape of contactors 49 and 50 may be varied considerably while still attaining the objects of the invention. Liquid hourly space velocities (LHSV) between 0.66 and 13.3 volumes of oil per hour per volume of catatlyst, with superficial linear velocities (cu. ft./sec. oil flow per sq. ft. contactor cross section) of from 0.0035 to 0.03 ft./sec. have been used with some success. However, more consistent results are obtained with lower space velocities, and it is recommended that the space velocity not exceed a value of about 8. The linear velocity does not appear critical, but slightly more consistent results are obtained at the higher linear velocities for a given LHSV. The size, shape, number and arrangement of the catalyst contactors most suitable to meet any particular condition or conditions may readily be determined by the skilled engineer, with the principles outlined herein in mind.

EXAMPLE 1

285 gallons per minute of raw diesel oil distillate having the characteristics shown in Table 1, received at a temperature of about 160° F. from the distillation of a California crude oil, are combined with about 9 gallons per minute of an aqueous 8° Bé. solution of commercial caustic soda. The combined stream is forced through a mixing valve wherein the caustic soda is dispersed in minute droplets throughout the oil thereby causing an immediate reaction between the caustic soda and the naphthenic acid contained in the oil. The resulting mixture is passed at a temperature of about 150° F. through an electrostatic separator wherein the reacted soda solution, with its naphthenic soap content, is separated from the oil under the influence of a high potential electric field. After passage through the electric separator, the oil is tested and shows a trace of alkalinity and a sample thereof, after cooling and drying, exhibits cloudiness. The stream of oil is then cooled to a temperature of about 90° F., by heat exchange with cooling water, and the cooled stream of oil is passed downwardly through two 7' x 24' vertical vessels in series, each vessel containing a 20' bed of ⅛" cobalt-molybdate catalyst pellets which are sulfided from use in catalytic hydrodesulfurization operations. After passage through the catalyst towers, the oil stream is bright and remains bright in storage.

TABLE 1.—OIL PROPERTIES OF EXAMPLE 1

|  | Before NaOH Treat | After Electric Separator | After Catalyst |
|---|---|---|---|
| A.S.T.M. dist'n (° F.) (approx.): | | | |
| IBP | 460 | | |
| 10% | 500 | | |
| 50% | 550 | Approx. same | |
| 90% | 630 | | |
| EP | 690 | | |
| Acidity (mg. KOH/gm.) | 1.5 | Tr. alk. | 0.026 |
| Cloudiness | Clear | Cloudy | Clear |
| Stability | Darkens | (¹) | (¹) |

¹ Color stable.

The liquid hourly space velocity in Example 1 is 1.48. The superficial linear velocity in Example 1 is 0.0165 ft./sec.

EXAMPLE 2

Raw diesel oil distillate at varying rates of flow is treated similarly to Example 1 for a period of more than a month, at the end of which time the effectiveness of the catalyst appears to be weakening. The catalyst vessels are sut down, and the catalyst therein is thoroughly washed (in situ) with water, after which the catalyst is dried by blowing steam through the vessels. The catalyst is then returned to service with apparent original effectiveness. During this entire period of operation the clarity of the oil leaving the catalyst vessels varies from day to day from clear to hazy, usually exhibiting a slight haze. This haze usually clears up within two or three days' storage but, in any event, is completely cleared by passing through a rock-salt drying column, either before or after storage. Table 2 shows information relating to this example.

TABLE 2.—CONDITIONS RELATING TO EXAMPLE 2

|  | Range | Approximate Average |
|---|---|---|
| Feed Oil: |  |  |
| ASTM distn. (° F.): |  |  |
| IBP | 400–475 | 440 |
| 10% | 440–520 | 475 |
| 50% | 500–575 | 530 |
| 90% | 580–650 | 615 |
| EP | 650–720 | 680 |
| Acidity (mg. KOH/gm.) | 1–3 | 1.6 |
| Temperature (° F.) | 80–175 | 130 |
| Clarity |  | Darkens |
| Charge Rate (gal./min.) | 120–285 | 200 |
| Caustic Soda: |  |  |
| Strength (° Bé) | 6.0–8.0 | 6.5 |
| Rate (vol./100 vol. oil) | 2.5–3.5 | 3.0 |
| Oil Leaving Electric Separator: |  |  |
| Temperature (° F.) | 60–200 | 130 |
| Acidity |  | Tr. alk. |
| Cloudiness | (1) | (2) |
| Catalyst Vessels: |  |  |
| Input temperature (° F.) | 70–100 | 85 |
| LHSV | 0.6–1.5 | 1.0 |
| Superficial Velocity (ft./sec.) | 0.007–0.016 | 0.01 |
| Aqueous Bottoms, Drain (gal./day) |  | Approx. 200 |
| Total Oil before Rewashing (gal.) |  | Approx. 10,000,000 |
| Oil Leaving Catalyst Vessels: |  |  |
| Acidity (mg. KOH/gm.) | 0.02–0.03 | 0.026 |
| Clarity | (3) | Sl. haze |
| Clarity after 2 day storage | (4) | (4) |
| Clarity after salt drier | Clear | Clear |

[1] Almost clear to cloudy.
[2] Hazy to cloudy.
[3] Clear to hazy.
[4] Clear to sl. haze.

EXAMPLE 3

Diesel oil similar to that of Example 1 is agitated with 8° Bé. caustic soda applied at the rate of three gallons per 100 gallons of oil. After ten minutes agitation the resulting mixture is allowed to settle, the oil is decanted and the decanted oil is stored for 48 hours after which time the oil remains cloudy. The cloudy oil is then passed through a column of sulfided cobaltmolybdate hydrodesulfurization catalyst at a LHSV of 7.5 and superficial linear velocity of 0.0021. The effluent oil is bright and remains bright on standing.

EXAMPLE 4

Separate portions of caustic washed naphthenic diesel oil distillate are passed through various contact materials at various rates, to compare the effect of different factors. In each case the caustic-washed oil is a small stream taken from the output of the electric separator of a commercial unit and the contact materials are contained in bench-scale apparatus. The details are given in Table 3. In certain cases (indicated by the term "wetted" in Table 3) the contact material is pre-wetted to simulate a material which has been in operation over an extended period of time and has become wetted with aqueous material removed from the oil.

It will be seen from Table 3 that, of the contact materials compared therein, those giving consistently acceptable results are (a) sulfided cobalt molybdate on alumina and (b) molybdena on alumina, both of which catalysts are recognized as having acidic surfaces.

TABLE 3.—COMPARATIVE RESULTS OF EXAMPLE 4

| Catalytic Material | Wetted | LHSV | SLV [1] | Clarity After Standing (days) | | | | | | |
|---|---|---|---|---|---|---|---|---|---|---|
|  |  |  |  | 0 | 1 | 2 | 3 | 4 | 5 | 6 |
| Series 1: |  |  |  |  |  |  |  |  |  |  |
| Mo on Al₂O₃ ⅛" pills | Yes | 2.9 | 0.0006 | Clear |  |  |  |  |  |  |
| Do | Yes | 10.0 | 0.0020 | do |  |  |  |  |  |  |
| None |  |  |  | Cloudy | Cloudy | Cloudy | Cloudy | Cloudy | Clear |  |
| Series 2: |  |  |  |  |  |  |  |  |  |  |
| Activated Bauxite 6–14 mesh. | Yes | 5.7 | 0.0011 | Very cloudy. | Very cloudy. |  |  |  |  | Very cloudy. |
| Ion Exchange Resin IRC-50. | Yes | 11.4 | 0.0023 | do | do |  |  |  |  | Do. |
| None |  |  |  | do | do |  |  |  |  | Do. |
| Series 3: |  |  |  |  |  |  |  |  |  |  |
| None |  |  |  | do | do |  |  |  |  |  |
| Regenerated (desulfided) CoMo on Al₂O₃. | Yes | 40 | 0.0080 | Hazy | Cloudy |  |  |  |  |  |
| Do | Yes | 2.5 | 0.0005 |  | Slightly hazy. |  |  |  |  |  |
| Sulfided CoMo on Al₂O₃ (used). | Yes | 40 | 0.0080 | Hazy | Very sl. hazy. |  |  |  |  |  |
| Do | Yes | 3.3 | 0.0006 |  | Clear & bright. |  |  |  |  |  |
| Mo on Al₂O₃ ⅛" pills | Yes | 40 | 0.0080 | Hazy | Very sl. haze. |  |  |  |  |  |
| Do | Yes | 3.1 | 0.0006 | Clear & bright. | Clear & bright. |  |  |  |  |  |
| Ion Exchange Resin IRC-50. | Yes | 30 | 0.0060 | Hazy | Hazy |  |  |  |  |  |
| Do | Yes | 2.6 | 0.0005 |  | Clear |  |  |  |  |  |
| Series 4: |  |  |  |  |  |  |  |  |  |  |
| Fresh CoMo on Al₂O₃ | Yes | 8 | 0.0016 | Cloudy | Cloudy |  | Cloudy |  |  |  |
| Activated Charcoal | Yes | 6.8 | 0.0013 | do | do |  |  |  |  |  |
| None |  |  |  | Very cloudy. | do |  | Very cloudy. |  |  |  |
| Series 5: |  |  |  |  |  |  |  |  |  |  |
| Regenerated (desulfided) CoMo on Al₂O₃. | No | 6.2 | 0.0017 |  | do | Bright |  |  |  |  |
| Do | No | 12.3 | 0.0034 |  | do |  |  | Bright |  |  |
| Sulfided CoMo on Al₂O₃ | No | 6.0 | 0.0017 |  | Bright |  |  |  |  |  |
| Do | No | 12.0 | 0.0034 |  | do |  |  |  |  |  |
| Sereis 6: |  |  |  |  |  |  |  |  |  |  |
| Sulfided [1] Regenerated CoMo on Al₂O₃ | Yes | 7.3 | 0.0020 | Clear | do |  |  |  |  |  |
| Do [2] | Yes | 16 | 0.0044 | Slightly cloudy. | Clear |  |  |  |  |  |
| Unsulfided Regenerated CoMo on Al₂O₃. | Yes | 7.7 | 0.0021 | Cloudy | Cloudy |  |  |  |  |  |
| Do | Yes | 15.4 | 0.0044 | do | do |  |  |  |  |  |

[1] SLV—superficial linear velocity (ft./sec.). [2] Artificially sulfided with aq. Na₂S.

I claim:
1. The method of improving the appearance and stability of light petroleum distillates containing undesirable organic acids, which comprises the steps of:
   mixing an acid-containing light distillate with aqueous alkali solution sufficient to react with the acids present in the oil and to dissolve the resulting soaps,
   separating the reacted aqueous solution from the treated oil, and
   passing the treated liquid oil through a bed of discrete contact elements composed of hydrodesulfurization catalyst at a temperature range of about 60° to 140° F.

2. In the treatment of light hydrocarbon oils to remove objectionable acidic materials therefrom and wherein the oil is contacted with an aqueous caustic solution to react with and remove acids contained in the oil and the aqueous solution is then separated from the oil, the method of reducing the tendency of the thus treated oil to become hazy which comprises passing the caustic treated liquid oil after separation of the caustic solution through a bed of discrete contact elements having molybdenum-containing acidic surfaces at a temperature range of about 60° to 140° F.

3. The method of claim 2 wherein the contact elements have surfaces composed of sulfided cobalt-molybdate.

4. The method of claim 3 wherein the contact elements are composed of alumina pellets having sulfided cobalt-molybdate surfaces.

5. The method of claim 2 in which the contact elements are composed of molybdena-on-alumina pellets.

6. The method of claim 2 in which the contact elements are composed of active hydrodesulfurization catalyst.

7. The method of claim 2 wherein the separation of the reacted aqueous solution from the treated oil is expedited by passing the oil-alkali mixture through a high potential electric field.

8. The method of claim 2 wherein the aqueous alkali is a caustic soda solution.

9. The method of claim 2 wherein the hydrocarbon oil has a boiling range above about 350° F. and below about 750° F.

10. The method of reducing the tendency of a hydrocarbon oil to become hazy which comprises passing a liquid stream of a haze-prone hydrocarbon oil that has been treated with caustic alkali solution to remove naphthenic acids therefrom through a bed of discrete contact elements having acidic molybdena-containing surfaces, the temperature of said liquid stream when passing through said bed being in the range of about 60° to 140° F.

11. The method of claim 2 wherein the temperature of the liquid oil when passing through the bed of contact elements is maintained between 60° and 100° F.

References Cited
UNITED STATES PATENTS

| | | | |
|---|---|---|---|
| 2,963,426 | 12/1960 | Holder | 108—263 |
| 3,034,980 | 5/1962 | Honeycutt | 208—263 |

SAMUEL P. JONES, *Primary Examiner.*

DELBERT E. GANTZ, *Examiner.*

UNITED STATES PATENT OFFICE
CERTIFICATE OF CORRECTION

Patent No. 3,378,485　　　　　　　　　　　　　　　April 16, 1968

Louis D. Rampino

It is hereby certified that error appears in the above numbered patent requiring correction and that the said Letters Patent should read as corrected below.

Column 2, line 17, "os" should read -- as --. Column 3, line 25, "approximately" should read -- approximating --; line 31, "prefarable" should read -- preferable --; line 33, "soil" should read -- oil --; line 50, "cause" should read -- causes --; line 67, "colled" should read -- cooled --; Column 4, line 10, "1/6" should read -- 1/8 --; line 26, "readly" should read -- readily --. Column 6, line 68, "sut" should read -- shut --. Columns 7 and 8, TABLE 3, column 3 Series 4, insert -- clear --, between "cloudy" and "very cloudy"; same TABLE 3, first column, (Catalytic Material), "Sereis 6" should read -- Series 6 --.

Signed and sealed this 11th day of November 1969.

(SEAL)
Attest:

EDWARD M. FLETCHER, JR.　　　　　　　　　WILLIAM E. SCHUYLER, JR.
Attesting Officer　　　　　　　　　　　　Commissioner of Patents